(12) United States Patent
Nagai

(10) Patent No.: US 6,476,801 B2
(45) Date of Patent: *Nov. 5, 2002

(54) PLASMA DISPLAY DEVICE DRIVE CIRCUIT IDENTIFIES SIGNAL FORMAT OF THE INPUT VIDEO SIGNAL TO SELECT PREVIOUSLY DETERMINED CONTROL INFORMATION TO DRIVE THE DISPLAY

(75) Inventor: Takayoshi Nagai, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,135

(22) Filed: Mar. 23, 1998

(65) Prior Publication Data

US 2002/0044105 A1 Apr. 18, 2002

(30) Foreign Application Priority Data

Mar. 31, 1997 (JP) ............................................. 9-081039

(51) Int. Cl.[7] ............................. G09G 5/00; G09G 3/28
(52) U.S. Cl. ......................... 345/213; 345/60; 348/558
(58) Field of Search ............................. 345/60, 68, 99, 345/100, 132, 213; 348/554, 555, 556, 558; 315/169.4

(56) References Cited

U.S. PATENT DOCUMENTS

| | | | | |
|---|---|---|---|---|
| 5,335,023 A | * | 8/1994 | Edwards | 345/100 |
| 5,420,602 A | * | 5/1995 | Kanazawa | 345/67 |
| 5,475,442 A | * | 12/1995 | Matsushita et al. | 348/554 |
| 5,534,940 A | * | 7/1996 | Sato et al. | 348/558 |
| 5,592,187 A | * | 1/1997 | Zenda | 345/213 |
| 5,610,623 A | * | 3/1997 | Takano et al. | 345/60 |
| 5,610,663 A | * | 3/1997 | Nan et al. | 345/213 |
| 5,717,467 A | * | 2/1998 | Shiki | 348/554 |
| 5,790,087 A | * | 8/1998 | Shigeta et al. | 345/67 |
| 5,790,096 A | * | 8/1998 | Hill, Jr. | 345/600 |
| 5,796,442 A | * | 8/1998 | Gove et al. | 348/558 |
| 5,854,540 A | * | 12/1998 | Matsumoto et al. | 315/169.1 |
| 5,859,626 A | * | 1/1999 | Kawamura | 345/698 |
| 5,894,299 A | * | 4/1999 | Tsuchiya et al. | 345/100 |
| 5,917,552 A | * | 6/1999 | Van Court | 348/558 |
| 5,926,174 A | * | 7/1999 | Shibamiya et al. | 345/213 |
| 5,953,074 A | * | 9/1999 | Reddy | 348/558 |
| 5,959,619 A | * | 9/1999 | Kameyama et al. | 345/204 |
| 5,990,858 A | * | 11/1999 | Ozolins | 345/698 |
| 6,037,917 A | | 3/2000 | Kawakami | 345/63 |
| 6,046,721 A | * | 4/2000 | Song et al. | 345/13 |
| 6,137,537 A | * | 10/2000 | Tsuji et al. | 348/554 |
| 6,215,467 B1 | * | 4/2001 | Suga et al. | 348/558 |

FOREIGN PATENT DOCUMENTS

| | | |
|---|---|---|
| JP | 1193797 A | 8/1989 |
| JP | 4211294 A | 8/1992 |
| JP | 5216433 A | 8/1993 |
| JP | 5313598 | 11/1993 |
| JP | 643829 | 2/1994 |
| JP | 10-39831 | 2/1998 |
| JP | 10-187094 | 7/1998 |
| JP | 3142705 | 12/2000 |

* cited by examiner

Primary Examiner—Steven Saras
Assistant Examiner—Paul A. Bell
(74) Attorney, Agent, or Firm—Birch, Stewart, Kolasch & Birch, LLP

(57) ABSTRACT

A plasma display device and a method of driving a plasma display which are capable of performing suitable display control in response to the signal format of an input signal are provided. Either a television signal or a graphic signal is inputted as the input signal. A signal format identification circuit identifies whether the signal format of the input signal is the television signal or the graphic signal. A mode-by-mode control signal generating portion determines the driving sequence of a driving circuit in response to the identified signal format to perform the driving control of the driving circuit. Then, a display panel is driven in response to the signal format of the input signal to display an image.

26 Claims, 8 Drawing Sheets

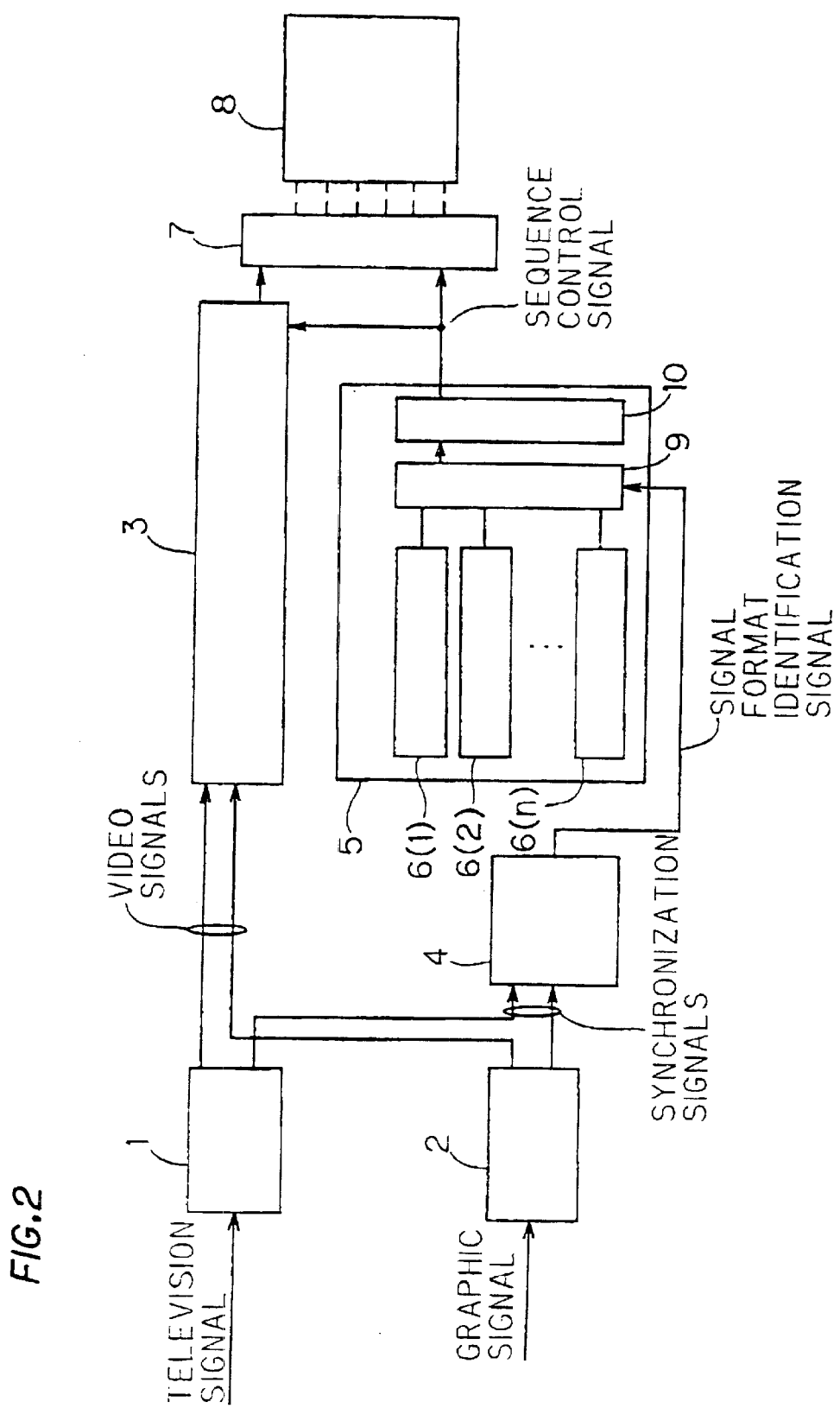

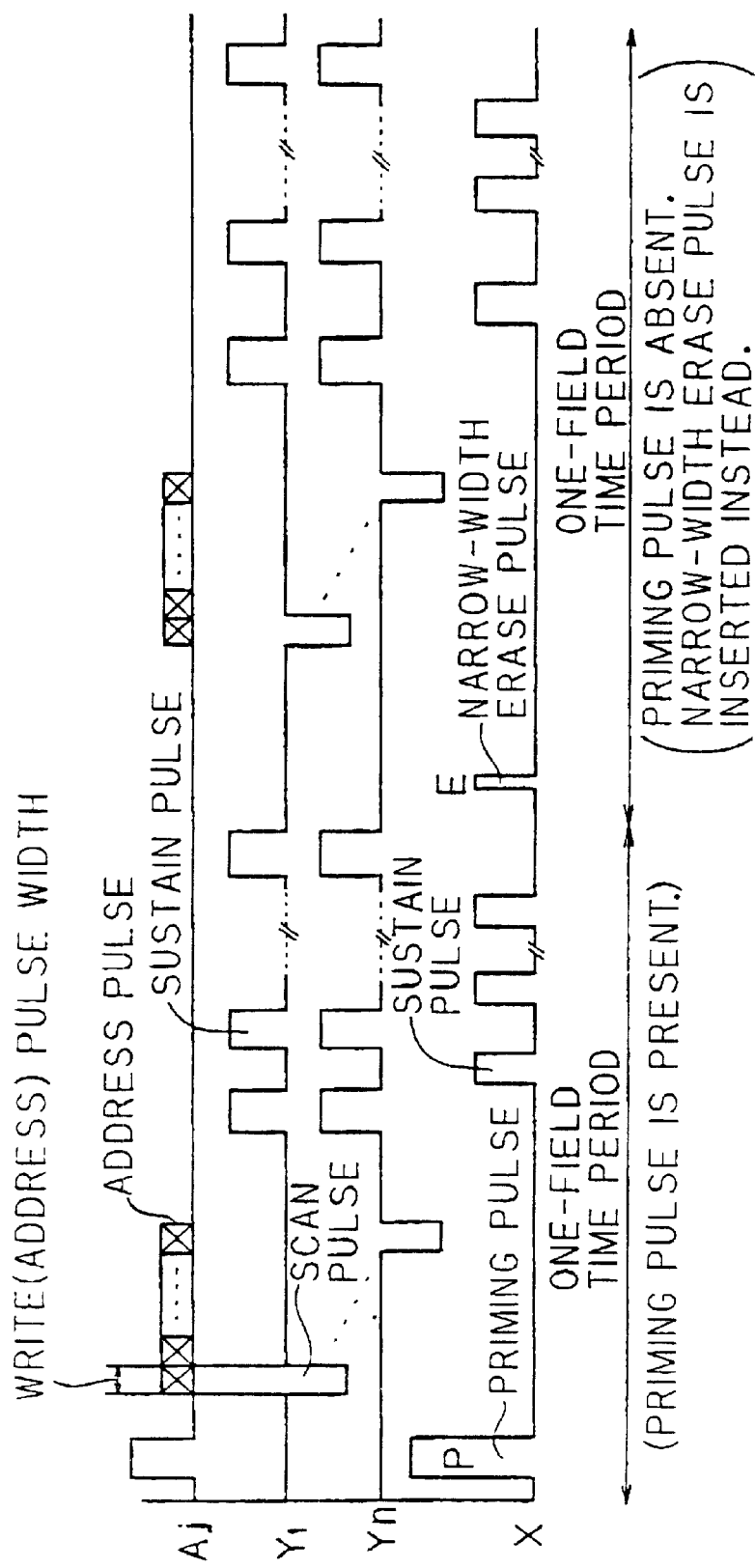

PLASMA DISPLAY DEVICE DRIVE CIRCUIT IDENTIFIES SIGNAL FORMAT OF THE INPUT VIDEO SIGNAL TO SELECT PREVIOUSLY DETERMINED CONTROL INFORMATION TO DRIVE THE DISPLAY

BACKGROUND OF THE INVENTION

1. Field of the Invention

The present invention relates to a plasma display device which controls signal processing in response to the signal format of an input signal.

2. Description of the Background Art

A plasma display panel (PDP) has been hithertofore known as one of the flat panel displays and received much attention as an alternative to a cathode ray tube (CRT).

Displaying an input video signal on a PDP requires the conversion of the video signal into pixel-by-pixel digital image data. Each pixel corresponds to a discharge cell which is a unit of discharge in the PDP. Gradation control at each discharge cell is such that a field is divided into subfields based on the number of gradation levels and luminescence or non-luminescence in each of the subfields is controlled. For example, if digital data indicative of a gradation level at each discharge cell is 6-bit digital data (64-level gradation), one field is divided into six subfields, and luminescence or non-luminescence in each of the six subfields is controlled depending on whether each bit is "1" or "0". The luminance at each discharge cell corresponds to the digital data by setting the ratio of the number of sustain pulses in each of the subfields to $2^5$ (MSB) to $2^0$ (LSB). Thus, the increase in the number of subfields increases the number of gradation levels to achieve smooth display having improved gradation properties.

The luminescence or non-luminescence at each discharge cell is controlled in a manner described below. First, a priming pulse is applied to force a discharge to be produced at all discharge cells and to erase wall charges. Then, a scan pulse is applied to a scan electrode and an address pulse is selectively applied to an address electrode depending on display data to control whether to provide wall charges or not. This determines whether to cause luminescence at the associated discharge cell using a subsequent sustain pulse or not. At this time, reliable luminescence and enhanced display stability are achieved by increasing the pulse width of the scan pulse to prolong write time for providing the wall charges.

The division of one field into subfields for display control at each discharge cell as above described presents a problem in that a pseudo contour is produced when a moving picture is displayed. Specifically, an observer that follows a moving picture with his or her eyes finds the pseudo contour produced in a section of an image where the gradation should change smoothly. To prevent this, it has been proposed to subdivide a predetermined number of subfields to alleviate the moving picture pseudo contour.

The above described control accomplishes multi-level gradation display, high-luminance display, stable luminescence, prevention of moving picture pseudo contours and the like in the PDP image display.

The time required for one field is a fixed value determined by an input signal dependent upon a signalling system such as NTSC, PAL, and VGA, and is generally 16 to 20 msec. The above described control must be performed within this limited length of time. Unfortunately, time is insufficient for the control that satisfies overall performance. Specifically, the increase in the number of subfields, the elongation of the write time, and the subdivision of the subfields require accordingly longer time for one-field display, resulting in the insufficient execution of the above described control.

Further, signals are classified depending on the signal format, for example, into an interlaced scanning signal (referred to hereinafter as an "interlace signal") and a non-interlaced scanning signal (referred to hereinafter as a "non-interlace signal"). The PDP which fundamentally uses the non-interlace signals for display is required to perform an interpolation process on the interlace signals to convert the interlace signals into the non-interlace signals. The interpolation process includes, for example, producing an intermediate horizontal line signal from two horizontal line signals, an upper and a lower. Disclosed in Japanese Patent Application Laid-Open No. P05-216433A (1993) is a simple process for driving the PDP so that one field of the interlace signal is displayed in a pair of lines, thereby to display the interlace signal, without using the conversion into the non-interlace signal by signal processing. This technique enables a pair of lines to be written at a time, reducing the time required for the write operation by half, but renders a displayed image rough on the whole since the same signal is displayed in the pair of lines. The use of this drive process requires the PDP to be used specifically for an interlace signal input and to fail to display the non-interlace signals such as VGA.

The time required for one field differs depending on the signal format of the input signal such as an NTSC system, a PAL system, VGA, and XGA. The level of the luminance in the plasma display is generally proportional to the frequency of the sustain pulse. Thus, changes in vertical synchronization frequency change the frequency of the sustain pulse depending on the signal format of the input signal, thereby changing the maximum luminance.

The amount of power consumption in the plasma display is proportional to the product of an APL (Average Picture Level) and the luminance. The APL is defined to mean a numerical value obtained by averaging the gradation levels (%) of all cells. For instance, the APL is 0% if black is displayed on the full screen, and is 100% if the highest gradation level of white is displayed on the full screen. The APL of a typical image is said to be an average of about 30 to 40%.

Thus, the increase in the frequency of the sustain pulse for higher luminance is not a problem for a typical screen but results in the increase in power consumption for a special screen, for example, a screen on which white is fully displayed. Countermeasures against this problem include APC (Automatic Power Control) which controls the luminance depending on the APL to suppress the power consumption at a fixed level or lower. This method is capable of suppressing maximum power consumption at a fixed level or lower on a typical screen while maintaining a high luminance, but presents another problem when a graphic signal (VGA, XGA and the like) from a personal computer is displayed. When a fixed screen (still picture) having a low APL is displayed in the form of a graphic signal, particular cells that continue high-luminance display are deteriorated, resulting in burning (image sticking on the screen).

Furthermore, in the PDP, a priming discharge (discharge at all cells) based on a priming pulse is carried out, for example, once for each subfield in order to enhance the discharge stability of the PDP. However, the priming discharge involves applying discharges to all discharge cells on the full screen at once to cause luminescence corresponding to a certain gradation level, resulting in low contrast. On the other hand, the decrease in the frequency of generation of the priming pulse leads to low discharge stability.

SUMMARY OF THE INVENTION

According to a first aspect of the present invention, a plasma display device comprises: control signal output means for outputting a control signal responsive to the signal format of an input video signal; and driving means for driving a plasma display panel based on the control signal outputted from the control signal output means.

Preferably, according to a second aspect of the present invention, the plasma display device of the first aspect further comprises: signal format identifying means for identifying the signal format of the input video signal, the signal format identifying means applying to the control signal output means an identification output responsive to the signal format of the input video signal.

Preferably, according to a third aspect of the present invention, in the plasma display device of the second aspect, the control signal output means includes selecting means for selecting one of a plurality of previously determined pieces of control information based on the identification output; and the control signal is provided based on the selected piece of control information.

Preferably, according to a fourth aspect of the present invention, in the plasma display device of the third aspect, the pieces of control information include the number of subfields which is previously determined in response to the signal format of the input video signal; and one field time period is divided into subfield time periods the number of which equals the number of subfields for representation of gradation.

Preferably, according to a fifth aspect of the present invention, in the plasma display device of the third aspect, the pieces of control information include frequency with which a priming pulse is generated per field, the frequency being previously determined in response to the signal format of the input video signal.

Preferably, according to a sixth aspect of the present invention, in the plasma display device of the fourth aspect, whether or not to divide the one field time period into the subfield time periods the number of which is greater than the minimum number of subfields required to represent the gradation in order to prevent a pseudo contour of a moving picture is controlled in response to the signal format of the input video signal.

Preferably, according to a seventh aspect of the present invention, in the plasma display device of the third aspect, the pieces of control information include a set value for write time per cell, the set value for write time being previously determined in response to the signal format of the input video signal; and a write operation of data into the plasma display panel is controlled based on the set value for write time.

Preferably, according to an eighth aspect of the present invention, in the plasma display device of the third aspect, the pieces of control information include the number of sustain pulses per field for an APL, the number of sustain pulses being previously determined in response to the signal format of the input video signal; and APC characteristics are changed based on the number of sustain pulses.

Preferably, according to a ninth aspect of the present invention, in the plasma display device of the third aspect, the pieces of control information include the number of sustain pulses per field, the number of sustain pulses being previously determined in response to the signal format of the input video signal.

Preferably, according to a tenth aspect of the present invention, in the plasma display device of the third aspect, the pieces of control information include color temperature conversion characteristics of image data, the color temperature conversion characteristics being previously determined in response to the signal format of the input video signal.

According to an eleventh aspect of the present invention, a method of driving a plasma display comprises the steps of: outputting a control signal in response to the signal format of an input video signal; and driving a plasma display panel based on the control signal.

Preferably, according to a twelfth aspect of the present invention, in the method of the eleventh aspect, the control signal is generated based on an identification output responsive to the signal format of the input video signal.

Preferably, according to a thirteenth aspect of the present invention, in the method of the twelfth aspect, the control signal is provided based on one piece of control information selected in response to the identification output among a plurality of previously prepared pieces of control information.

Preferably, according to a fourteenth aspect of the present invention, in the method of the thirteenth aspect, the pieces of control information include the number of subfields which is previously determined in response to the signal format of the input video signal; and one field time period is divided into subfield time periods the number of which equals the number of subfields for representation of gradation.

Preferably, according to a fifteenth aspect of the present invention, in the method of the thirteenth aspect, the pieces of control information include frequency with which a priming pulse is generated per field, the frequency being previously determined in response to the signal format of the input video signal.

Preferably, according to a sixteenth aspect of the present invention, in the method of the fourteenth aspect, whether or not to divide the one field time period into the subfield time periods the number of which is greater than the minimum number of subfields required to represent the gradation in order to prevent a pseudo contour of a moving picture is controlled in response to the signal format of the input video signal.

Preferably, according to a seventeenth aspect of the present invention, in the method of the thirteenth aspect, the pieces of control information include a set value for write time per cell, the set value for write time being previously determined in response to the signal format of the input video signal; and a write operation of data into the plasma display panel is controlled based on the set value for write time.

Preferably, according to an eighteenth aspect of the present invention, in the method of the thirteenth aspect, the pieces of control information include the number of sustain pulses per field for an APL, the number of sustain pulses being previously determined in response to the signal format of the input video signal; and APC characteristics are changed based on the number of sustain pulses.

Preferably, according to a nineteenth aspect of the present invention, in the method of the thirteenth aspect, the number of sustain pulses is in inverse proportion to the frequency of a vertical synchronization signal in the input video signal.

Preferably, according to a twentieth aspect of the present invention, in the method of the thirteenth aspect, the pieces of control information include color temperature conversion characteristics of image data, the color temperature conversion characteristics being previously determined in response to the signal format of the input video signal.

In accordance with the first aspect of the present invention, the control signal responsive to the signal format of the input video signal is outputted, and the PDP is driven based on the control signal. Thus, the PDP may be driven under different driving conditions for each signal format of the input video signal. The PDP may be optimally driven in response to individual video signals while taking full advantage of higher-priority characteristics determined by the input video signal under various restrictive conditions presented when the input video signal is displayed on the PDP (e.g., the sequence time which is originally required for optimum display on the PDP is limited by the video signal; a luminance and the suppression of the degree of sticking conflict with each other; and display contrast and display stability conflict with each other).

In accordance with the second aspect of the present invention, the control signal output means outputs the control signal in response to and based on the signal format of the input video signal identified by the signal format identification means. This allows the plasma display to be automatically driven in response to the signal format of the input video signal.

In accordance with the third aspect of the present invention, the control signal is provided based on the selected one of the plurality of pieces of control information possessed by the control signal output means. The preparation of optimum driving conditions responsive to the signal format of the input video signal as the control information ensures the setting of the optimum driving conditions.

In accordance with the fourth aspect of the present invention, the gradation is represented by dividing the one field time period into the plurality of subfield time periods, and the number of subfields is determined according to the respective signal formats of the input video signal. Depending upon the signal format of the input video signal, the number of gradation levels is preferably greater in some cases, and need not be so great in other cases. The optimum number of gradation levels may be set in accordance with such requirements. In particular, the setting of a greater number of gradation levels allows smooth display, and the setting of a smaller number of gradation levels provides a resultant time margin to be used to enhance other characteristics.

In accordance with the fifth aspect of the present invention, the frequency with which the priming pulse is generated per field is set in response to the signal format of the input video signal. Depending on the signal format of the input video signal, the contrast is preferably high in some cases and need not be so high in other cases. Further, flicker is conspicuous in some cases and is not so conspicuous in other cases. The fifth aspect of the present invention provides an optimum display image (e.g., an image having not so high contrast but high display stability with less flicker, or an image having not so high display stability but high contrast) for each signal format of the input video signal as the case may be.

In accordance with the sixth aspect of the present invention, whether or not to divide the one field time period into the subfield time periods the number of which is greater than the minimum number of subfields required to represent the gradation in order to prevent the pseudo contour of the moving picture is controlled in response to the signal format of the input video signal. Depending on the signal format of the input video signal, the moving picture pseudo contour is a significant problem in some cases and is not so significant in other cases. As the case may be, the moving picture pseudo contour is suppressed in response to the input video signal for which the pseudo contour is the problem, and measures against the moving picture pseudo contour need not be taken in response to the input video signal for which the pseudo contour is not so significant. The time margin provided by the non-execution of the measures against the moving picture pseudo contour may be used to enhance other characteristics.

In accordance with the seventh aspect of the present invention, the write time per cell during the write operation of data into the PDP is previously determined in response to the signal format of the input video signal. Depending on the signal format of the input video signal, flicker is a significant problem in some cases and is not so significant in other cases. For the input video signal for which flicker is the significant problem, the write time is elongated to increase the display stability, providing the image with less flicker. For the input video signal for which flicker is not so significant, the write time may be shortened, and the resultant time margin may be used to enhance other characteristics.

In accordance with the eighth aspect of the present invention, the number of sustain pulses per field for the APL is previously determined in response to the signal format of the input video signal. For the input video signal for which burning is a significant problem, the APC characteristics are changed so that the peak luminance is suppressed to prevent the sticking. For the input video signal for which the burning is not so significant, the APC characteristics are changed so that the peak luminance is increased to provide a well-contrasted image.

In accordance with the ninth aspect of the present invention, the number of sustain pulses per field is changed in response to the signal format of the input video signal. Thus, the screen is displayed with a luminance suitable for the input video signal.

In accordance with the tenth aspect of the present invention, the characteristics of color temperature conversion processing performed on image data are changed in response to the signal format of the input video signal. This provides an image having the optimum relationship between the color temperature and the luminance in response to the signal format of the input video signal under such PDP display restrictive conditions that the increase in color temperature requires the decrease in luminance.

In accordance with the eleventh aspect of the present invention, the control signal responsive to the signal format of the input video signal is outputted, and the PDP is driven based on the control signal. Thus, the PDP may be driven under different driving conditions for each signal format of the input video signal. The PDP may be optimally driven in response to individual video signals while taking full advantage of higher-priority characteristics determined by the input video signal under various restrictive conditions presented when the input video signal is displayed on the PDP (e.g., the sequence time which is originally required for optimum display on the PDP is limited by the video signal; the luminance and the suppression of the degree of sticking conflict with each other; and the display contrast and the display stability conflict with each other).

In accordance with the twelfth aspect of the present invention, the control signal is generated based on the identification output responsive to the signal format of the input video signal. This allows the plasma display to be automatically driven in response to the signal format of the input video signal.

In accordance with the thirteenth aspect of the present invention, the control signal is provided based on the selected one of the plurality of pieces of control information. The preparation of optimum driving conditions responsive to the signal format of the input video signal as the control information ensures the setting of the optimum driving conditions.

In accordance with the fourteenth aspect of the present invention, the gradation is represented by dividing the one field time period into the plurality of subfield time periods, and the number of subfields is determined according to the respective signal formats of the input video signal. Depending upon the signal format of the input video signal, the number of gradation levels is preferably greater in some cases, and need not be so great in other cases. The optimum number of gradation levels may be set in accordance with such requirements. In particular, the setting of a greater number of gradation levels allows smooth display, and the setting of a smaller number of gradation levels provides a resultant time margin to be used to enhance other characteristics.

In accordance with the fifteenth aspect of the present invention, the frequency with which the priming pulse is generated per field is set in response to the signal format of the input video signal. Depending on the signal format of the input video signal, the contrast is preferably high in some cases and need not be so high in other cases. Further, flicker is conspicuous in some cases and is not so conspicuous in other cases. The seventeenth aspect of the present invention provides an optimum display image (e.g., an image having not so high contrast but high display stability with less flicker, or an image having not so high display stability but high contrast) for each signal format of the input video signal as the case may be.

In accordance with the sixteenth aspect of the present invention, whether or not to divide the one field time period into the subfield time periods the number of which is greater than the minimum number of subfields required to represent the gradation in order to prevent the pseudo contour of the moving picture is controlled in response to the signal format of the input video signal. Depending on the signal format of the input video signal, the moving picture pseudo contour is a significant problem in some cases and is not so significant in other cases. As the case may be, the moving picture pseudo contour is suppressed in response to the input video signal for which the pseudo contour is the problem, and measures against the moving picture pseudo contour need not be taken in response to the input video signal for which the pseudo contour is not so significant. The time margin provided by the non-execution of the measures against the moving picture pseudo contour may be used to enhance other characteristics.

In accordance with the seventeenth aspect of the present invention, the write time per cell during the write operation of data into the PDP is previously determined in response to the signal format of the input video signal. Depending on the signal format of the input video signal, flicker is a significant problem in some cases and is not so significant in other cases. For the input video signal for which flicker is the significant problem, the write time is elongated to increase the display stability, providing the image with less flicker. For the input video signal for which flicker is not so significant, the write time may be shortened, and the resultant time margin may be used to enhance other characteristics.

In accordance with the eighteenth aspect of the present invention, the number of sustain pulses per field for the APL is previously determined in response to the signal format of the input video signal. For the input video signal for which burning is a significant problem, the APC characteristics are changed so that the peak luminance is suppressed to prevent the sticking. For the input video signal for which burning is not so significant, the APC characteristics are changed so that the peak luminance is increased to provide a well-contrasted image.

In accordance with the nineteenth aspect of the present invention, the number of sustain pulses per field is changed in response to the signal format of the input video signal. Thus, the screen is displayed with a luminance suitable for the input video signal.

In accordance with the twentieth aspect of the present invention, the characteristics of color temperature conversion processing performed on image data are changed in response to the signal format of the input video signal. This provides an image having the optimum relationship between the color temperature and the luminance in response to the signal format of the input video signal under such PDP display restrictive conditions that the increase in color temperature requires the decrease in luminance.

It is therefore an object of the present invention to provide a plasma display device and a method of driving a plasma display which provide better display control in response to the signal format of an input signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing the general construction of the plasma display device according to the preferred embodiment of the present invention;

FIG. 8 is a timing chart illustrating the timing of generation of a priming pulse P in the plasma display device according to the preferred embodiment of the present invention.

DESCRIPTION OF THE PREFERRED EMBODIMENTS

A preferred embodiment of the present invention will now be described with reference to the drawings.

Figure 1A:
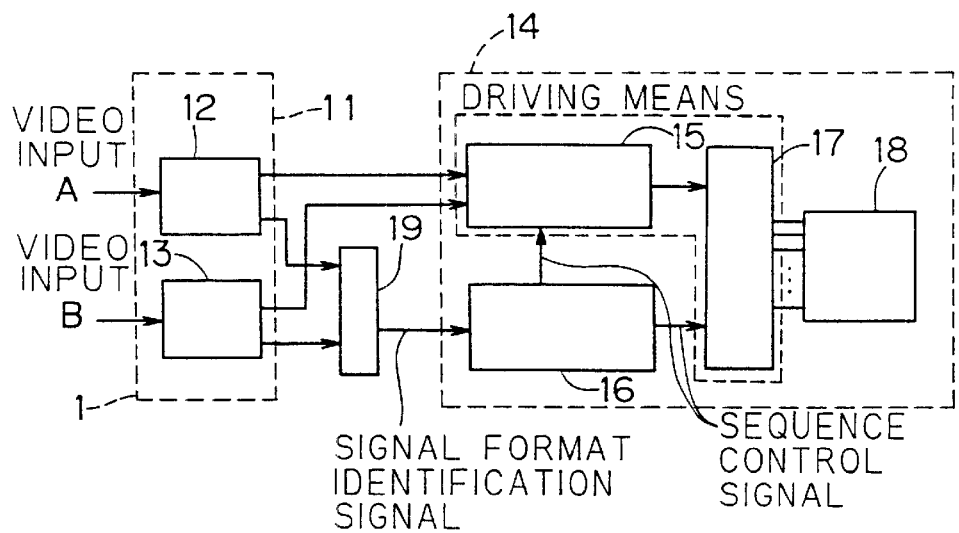
FIG. 1A is a block diagram showing the general construction of a plasma display device according to a preferred embodiment of the present invention.
Figure 1B:
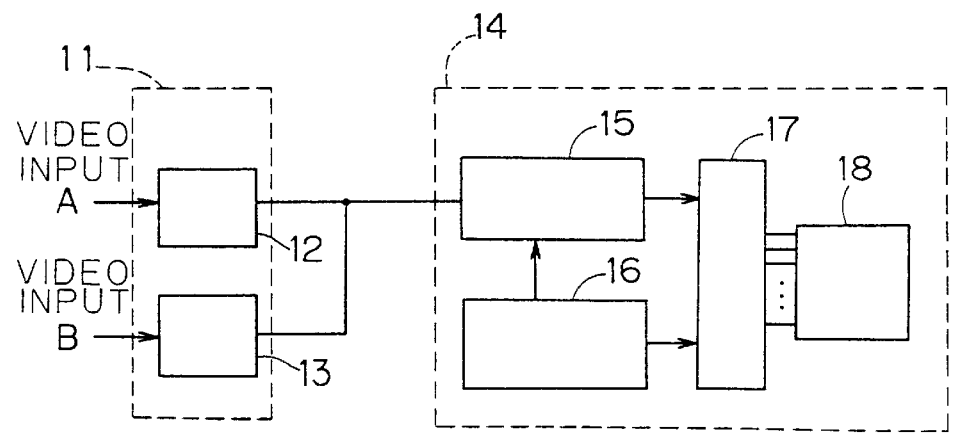
FIG. 1B is a block diagram showing the general construction of a conventional plasma display device for comparison with that of FIG. 1A.

FIG. 1A is a block diagram showing the general construction of a plasma display device according to a preferred embodiment of the present invention. FIG. 1B is a block diagram showing the construction of a conventional plasma display device for comparison with that of FIG. 1A.

A plurality of video inputs (video inputs A and B in FIGS. 1A and 1B) are applied to an input-by-input signal processing portion 11. The input-by-input signal processing portion 11 comprises signal processing portions 12 and 13 corresponding to the video inputs A and B, respectively. Video signals processed in the input-by-input signal processing portion 11 are applied to a PDP module portion 14. The PDP module portion 14 comprises a video signal processing portion 15, a control signal generating portion 16, a driving portion 17, and a display panel 18.

The PDP module portion 14 receives a digital image signal comprising, for example, 8 bits for each of RBG, vertical and horizontal synchronization signals, and a dot clock. The video signal processing portion 15 mainly performs signal processing inherent in the PDP, such as sorting of image data. For instance, upon receipt of respective 8-bit signals for RGB in parallel, the video signal processing portion 15 performs processing such as sorting of the signals in the order of gradation bits so as to conform to the subfield gradation technique, and then transmits processed data to the driving portion 17.

The control signal generating portion 16 includes a storage element such as a ROM for storing information about a PDP driving sequence, and outputs a sequence control signal based on the information. The sequence control signal is applied to the driving portion 17 and the video signal processing portion 15.

The driving portion 17 applies drive pulses such as a priming pulse, an address pulse, and a sustain pulse to the display panel 18 based on the sequence control signal from the control signal generating portion 16 and the video signal from the video signal processing portion 15.

The video inputs A and B to the plasma display device include a television signal such as NTSC and a graphic signal such as VGA. The formats of these signals must be made compatible with the input format of the PDP module portion 14. In the conventional plasma display device, the input-by-input signal processing portion 11 comprising the signal processing portions 12 and 13 corresponding respectively to the video inputs A and B is provided ahead of the PDP module portion 14 so that the signal processing portions 12 and 13 perform sync separation, video demodulation, A/D conversion and scanning line interpolation on the NTSC signal and perform only A/D conversion on the VGA signal to convert the video input signals into signals independent of signal formats to output the resultant signals to the PDP module portion 14.

The plasma display device according to the preferred embodiment of the present invention comprises a signal format identification portion 19 in addition to the conventional construction so that the result of identification in the signal format identification portion 19 is applied to the control signal generating portion 16. Further, the control signal generating portion 16 is variable for changing the PDP driving sequence and an image signal processing scheme based on the identification result from the signal format identification portion 19.

Such an arrangement allows the PDP to be driven under different conditions depending on the input video signals. Thus, under various restrictive conditions for displaying the input video signals on the PDP, the PDP is optimally driven in response to the video signal format while taking full advantage of higher-priority characteristics determined by the input video signals. Additionally, since the operation of the PDP module portion 14 is variable in response to the input video signals, the conventional conversion of the input video signals into the same signal format in the input-by-input signal processing portion 11 may be replaced with equivalent processing using the driving sequence. In this manner, some of the operations of the input-by-input signal processing portion 11 are simplified. Furthermore, the procedure of a series of processes from the signal processing to the driving sequence may be optimized in accordance with the signal format of the input video signals.

FIG. 2 is a block diagram of an arrangement of the plasma display device of FIG. 1A for practical application.

The plasma display device shown in FIG. 2 may receive as input signals a television signal (NTSC, PAL and the like) and a graphic signal (VGA, XGA) from a personal computer. One of the television signal and the graphic signal is selectively applied to the plasma display device, subjected to predetermined processing, and displayed on a display panel 8. The television signal is applied to a sync separation circuit 1 whereas the graphic signal is applied to a sync separation circuit 2. The sync separation circuits 1 and 2 extract vertical and horizontal synchronization signals from the input signal. Some of the graphic signals contain synchronization signals which are inputted after being separated, and in this case the sync separation circuit 2 is not required.

The video signals obtained by extracting the synchronization signals are applied to a video signal processing circuit 3 and converted to digital image data for display. Specifically, the video signal processing circuit 3 performs video demodulation, inverted gamma correction, color temperature conversion, sorting of image data, and the like. The synchronization signals extracted in the sync separation circuits 1 and 2 are applied to a signal format identification circuit 4. The signal format identification circuit 4 identifies (i) whether the input signal is the television signal or the graphic signal; (ii) whether the input signal is an NTSC signal, a PAL signal, or an SECAM signal if it is the television signal; and (iii) whether the input signal is a VGA signal or an XGA signal if it is the graphic signal.

The identification of the signal format in the signal format identification circuit 4 is accomplished using techniques to be described below. The techniques which may be suitably adopted include (i) identifying whether the input signal is the television signal or the graphic signal depending on whether the synchronization signal is inputted from the sync separation circuit 1 for the television signal or the synchronization signal is inputted from the sync separation circuit 2 for the graphic signal; (ii) discriminating between the television signal and the graphic signal and identifying signal formats of the television signal and the graphic signal based on periods of the synchronization signal which are counted using a fixed clock; (iii) discriminating between the television signal and the graphic signal and identifying signal formats of the television signal and the graphic signal based on the counted number of horizontal synchronization signals among vertical synchronization signals, and (iv) discriminating between the television signal and the graphic signal and identifying signal formats of the television signal and the graphic signal based on the polarities of the vertical and horizontal synchronization signals. The signal format is sometimes identified based on the character of an image discriminating between a moving picture and a still picture and also may be identified in consideration for both the synchronization signal and the character of an image discriminating between a moving picture and a still picture. A signal type input entered via a manual switch may be used as the signal format identification signal without employing the above discussed automatic identification.

The signal format identification circuit 4 produces the signal format identification signal in response to the detected signal format to applies the signal format identification signal to a mode-by-mode control signal generating circuit 5. The mode-by-mode control signal generating circuit 5 contains a plurality of pieces of control signal information 6(1) to 6(n) corresponding to respective modes. The signal format identification signal outputted from the signal format identification circuit 4 is applied to a selector 9 provided in the mode-by-mode control signal generating circuit 5. The selector 9 selects one of the pieces of control signal information 6(1) to 6(n) based on the signal format identification signal to apply the selected piece of control signal information to a control signal generating circuit 10. Based on the applied piece of control signal information, the control signal generating circuit 10 generates various sequence control signals corresponding to respective signal formats. The sequence control signals are applied to the video signal processing circuit 3 and a driving circuit 7.

The video signal processing circuit 3 performs predetermined processing on the video signals given from the sync separation circuits 1 and 2. The predetermined processing includes, for example, video demodulation, gamma correction, and color temperature correction, but different processes are performed on the video signals depending on the different sequence control signals given from the mode-by-mode control signal generating circuit 5. The driving circuit 7 generates a predetermined drive pulse in response to the image data from the video signal processing circuit 3 and the sequence control signals from the mode-by-mode control signal generating circuit 5 to drive the display panel 8 using the predetermined drive pulse. This causes luminescence responsive to the image data on the display panel 8.

In the plasma display device of the preferred embodiment, the PDP driving scheme is controlled in response to the sequence control signals from the mode-by-mode control signal generating circuit 5 which in turn contains the plurality of pieces of control signal information 6(1) to 6(n) corresponding to the respective signal formats of the video input. If the signal format identification circuit 4 identifies that the video input is, for example, and NTSC television signal, the selector 9 selects and outputs a piece of control signal information corresponding to the NTSC signal among the pieces of control signal information 6(1) to 6(n), and the control signal generating circuit 10 generates the corresponding driving sequence based on the piece of control signal information outputted from the selector 9. The PDP is thus driven in response to the signal format of the input video signal to achieve optimum display.

Items changeable depending on the signal format of the input signal in the driving method are described below. Suitably changing the control contents of these items in accordance with the signal format of the input signal achieves optimum display.

The items are as follows:
(A) The number of gradation levels
(B) The adoption/non-adoption of measures against a moving picture pseudo contour (subdivision of subfields and the like)
(C) Writing Sequence (whether the interlace/non-interlace conversion is performed by signal processing or the interlace signal is written as it is into two lines so that the driving sequence conforms to the interlace signal)
(D) APC characteristics
(E) The number of times of a priming discharge per field
(F) Write time per cell
(G) The number of sustain pulses per field
(H) Color temperature conversion
These items are specifically described hereinafter.

(A) The number of gradation levels

The plasma display device according to the preferred embodiment of the present invention controls the driving circuit 7 in response to the signal format of the input signal to control the number of gradation levels for display on the display panel 8. Specifically, whether the input signal is the graphic signal or the television signal is recognized based on the signal format identification signal from the signal format identification circuit 4. Then, the mode-by-mode control signal generating circuit 5 selects and outputs one of the pieces of control signal information 6(1) to 6(n) in response to the recognized signal format. Accordingly, the sequence control signal to be applied to the driving circuit 7 is changed in response to the signal format of the input signal, and the number of gradation levels in the display panel 8 is also changed. For example, 64-level gradation with 6 subfields is employed if the input signal is the graphic signal, and 256-level gradation with 8 subfields is employed if the input signal is the television signal.

Figure 3A:
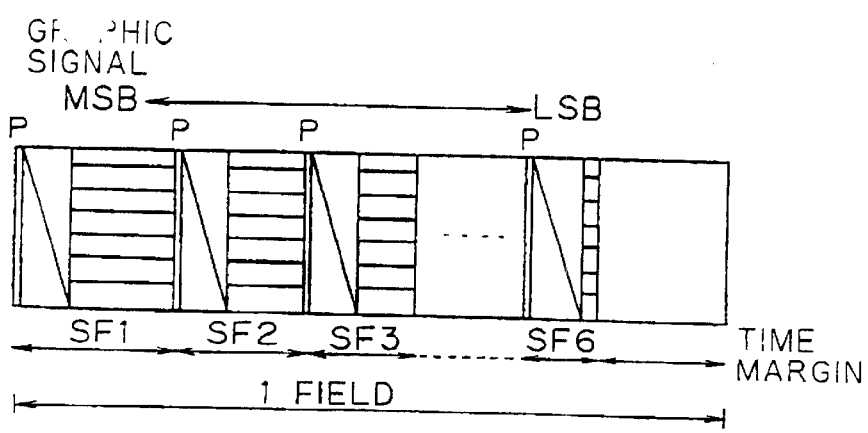
FIGS. 3A and 3B illustrate the control of the number of gradation levels in the plasma display device according to the preferred embodiment of the present invention.
Figure 3B:
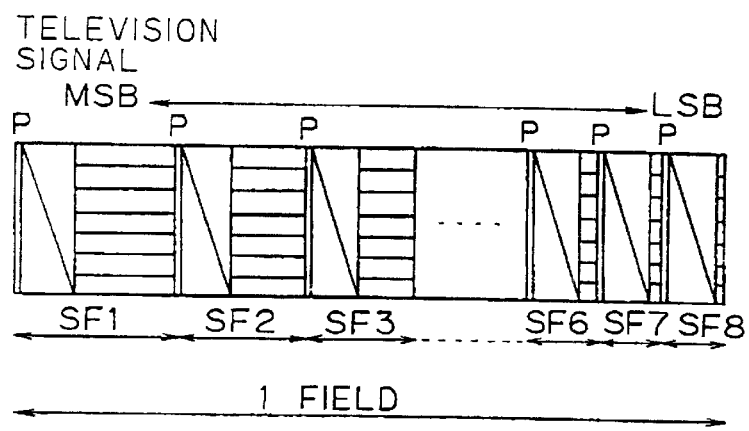

In the case of the graphic signal, as shown in FIG. 3A, the display panel is driven using six subfields SF1 (corresponding to the MSB of image data) to SF6 (corresponding to the LSB of the image data). In the case of the television signal, as shown in FIG. 3B, the display panel is driven using eight subfields SF1 (corresponding to the MSB of image data) to SF8 (corresponding to the LSB of the image data). Then, luminance control with 64-level gradation is performed on the graphic signal whereas luminance control with 256-level gradation is performed on the television signal.

The drive operation in one subfield is performed in the following order: (i) a priming discharge by means of one priming pulse, (ii) writing in response to data of a given bit for each horizontal line by means of a write pulse, and (iii) luminescence by means of a sustain pulse. In FIGS. 3A and 3B, the time periods for the operations (i) to (iii) are indicated respectively by the blank and "P", the line slanted downward to the right, and the horizontal parallel lines.

The drive operation in the subfield SF1 corresponding to the MSB of the image data, for example, is contemplated. The driving circuit 7 initially applies a high voltage to all discharge cells using X electrodes extending in the vertical direction in response to a priming pulse to cause luminescence on the full screen. Next, the driving circuit 7 is supplied with the MSBs of the image data of all pixels (n discharge cells arranged in the horizontal direction by m discharge cells arranged in the vertical direction) from the video signal processing circuit 3, and the driving circuit 7 controls whether to apply voltage or not to each discharge cell in each horizontal line in response to the data "1" and "0" for each pixel to provide a wall charge to each discharge cell (write data in each discharge cell). The driving circuit 7 then applies a sustain pulse to all discharge cells to cause only the discharge cells to which the wall charge has been provided to produce a discharge. Upon completion of the drive operation in the subfield corresponding to the MSB, the drive operation using the data of the subsequent bits is performed in sequential order. The sequential reduction in the time period for which the sustain pulse is applied during the drive operation by half allows the discharge in one field to conform to the image data.

The increase in the number of gradation levels permits accordingly minute control of the gradation levels and smooth display, but also accordingly increases the number of subfields, making difficult the processing within a predetermined one-field time period. More specifically, display with 256-level gradation requires eight subfields, resulting in lack of processing time in some cases even by the full use of one-field time as shown in FIG. 3B. On the other hand, display with 64-level gradation requires only six subfields to provide a time margin as shown in FIG. 3A.

A television image is generally a natural image which often shows smooth change in gradation. Thus, it is desired to display the television image with more levels of gradation. The 256-level gradation allows suitable display to human eyes.

On the other hand, a graphic image produced using a computer has a clearly distinct contour. Thus, the graphic image does not require so many gradation levels, and the 64-level gradation allows display which presents no visual problem. As described above, display with 64-level gradation produces the time margin which in turn may be utilized to perform other processes including, for example, the process of prolonging the write time for providing a wall charge to render the subsequent discharge more stable. In contrast with this, if time is insufficient to display the television signal with 256-level gradation, one-line data may be simultaneously written into two lines by utilizing the fact that the television signal is generally an interlace signal, thereby reducing time. These processes will be described later.

(B) Adoption/non-adoption of measures against moving picture pseudo contour

In accordance with the preferred embodiment of the present invention, whether to take measures against the moving picture pseudo contour or not is controlled depending on whether the input signal is the television signal or the graphic signal.

Figure 4:
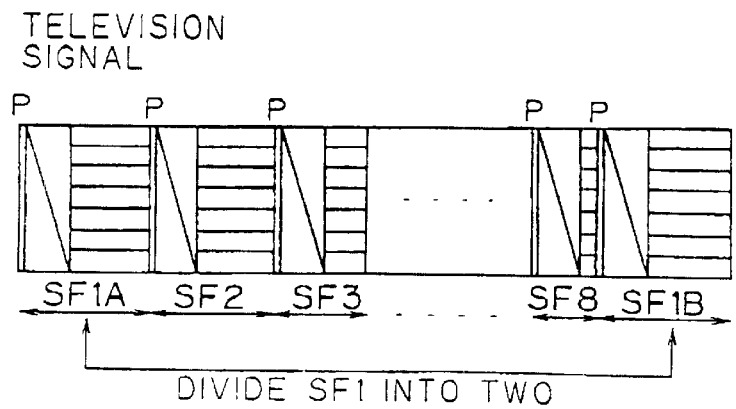
FIG. 4 illustrates measures against a moving picture pseudo contour in the plasma display device according to the preferred embodiment of the present invention.

The measures against the moving picture pseudo contour include the process of subdividing the subfield corresponding to the MSB as disclosed in, for example, U.S. Pat. No. 5,187,578. More specifically, the subfield SF1 is divided into two subfields SF1A and SF1B and the subfield SF1B is positioned to follow the subfield SF8 corresponding to the LSB, as shown in FIG. 4. In this manner, dividing the subfield having a long luminescence time period into the two subfields and placing the two subfields respectively at the first and last locations of one field may provide uniform time for luminescence and suppress the occurrence of the moving picture pseudo contour. This technique, however, increases the number of subfields to require longer time for one-field display.

The measures against the moving picture pseudo contour may include dividing not only the subfield corresponding to the MSB but also the subfield corresponding to the second most significant bit. Further, a technique as disclosed in Japanese Patent Application No. P08-147198 (1996) may be used which produces two luminance ratio patterns to switch therebetween for each discharge cell, rather than setting the luminance ratio (luminescence time by means of the sustain pulse) of the subfields to $2^n$. In either method, however, the number of subfields is similarly increased and it takes longer time for one-field display.

The preferred embodiment of the present invention takes the measures against the moving picture pseudo contour if the input signal is the television signal and does not take the measures if the input signal is the graphic signal. An image on the television screen is a natural image containing a moving picture with smoothly changing gradation, and hence is prone to produce a moving picture pseudo contour. For this reason, the above described measures against the moving picture pseudo contour are taken if the input signal is the television signal. On the other hand, a graphic image often contains no high-quality moving pictures, and in few cases presents the problem of the moving picture pseudo contour. For this reason, the measures against the moving picture pseudo contour are not taken if the input signal is the graphic signal. This provides a time margin to be used for other processes.

(C) Writing sequence

In the preferred embodiment of the present invention, the writing sequence for displaying the input video signal inputted in the form of an interlace signal or a non-interlace signal on the PDP is changed in response to the input signal. To display the interlace signal on the PDP, it is a common practice to produce new line data interpolated between upper and lower scanning lines to convert the interlace signal into a non-interlace signal. As disclosed in Japanese Patent Application Laid-Open No. P05-216433A (1993), the process of writing one-line data into two lines may be performed. This process eliminates the need to convert the interlace signal into the non-interlace signal and reduce the write time.

Figure 5:
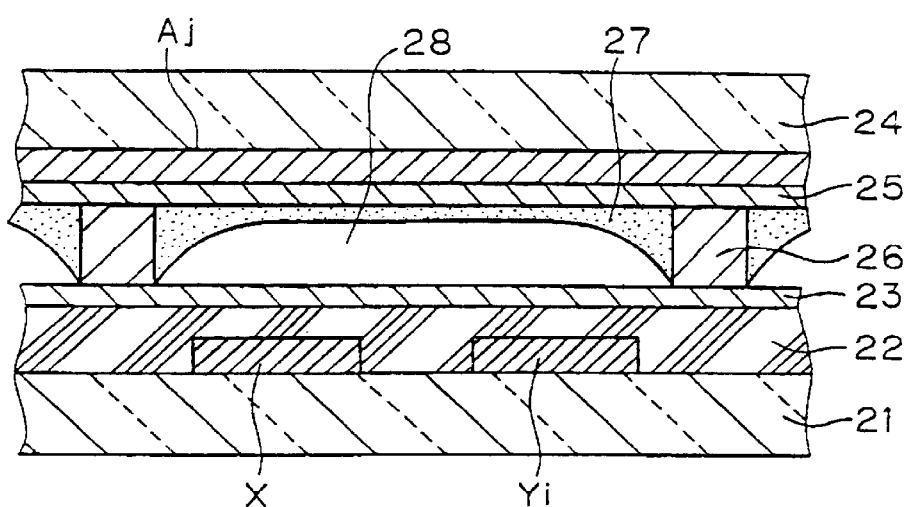
FIG. 5 is a sectional view of a discharge cell in the plasma display device according o the preferred embodiment of the present invention.

The operation of the above described process is discussed with reference to FIGS. 5, 6A and 6B. FIG. 5 is a sectional view of a cell of the PDP. In FIG. 5, the reference character X designates a sustain electrode, and Yi designates a scan electrode. The sustain electrode X and the scan electrode Yi are both formed on a glass substrate 21. The reference numeral 22 designates a dielectric layer formed on the sustain electrode X and the scan electrode Yi; 23 designates a protective layer formed on the dielectric layer 22; the reference character Aj designates an address electrode formed on a glass substrate 24 opposed to the glass substrate 21; 25 designates a dielectric layer formed on the address electrode; 26 designates a barrier rib formed on the boundary between adjacent cells; 27 designates a phosphor; and 28 designates a discharge space filled with, for example, a gas mixture of neon and xenon.

Figure 6A:
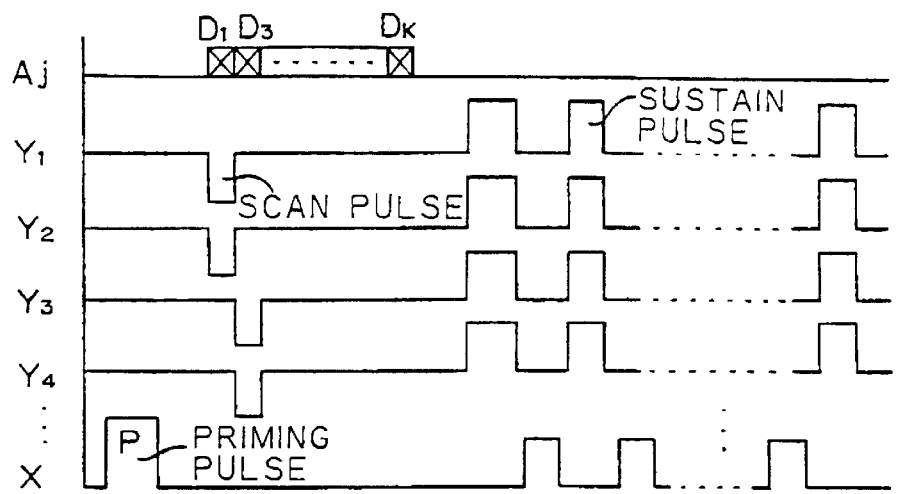
FIGS. 6A and 6B are timing charts illustrating simultaneous two-line writing in the plasma display device according to the preferred embodiment of the present invention.

FIG. 6A is a timing chart showing a one-subfield operation when an odd-numbered field data is inputted. Initially, a priming pulse P is applied to the sustain electrode X. Then, a wall charge is provided to (data is written to) an object discharge cell in response to data D1 in the first line of the address electrode Aj. At this time, the wall charge is provided using the same data in the first line to the second line as well as to the first line. Specifically, data is written into discharge cells in the first and second horizontal lines having data "1" by applying the scan pulse to scan electrodes Y1 and Y2 and applying voltage based on the data D1 to the address electrode Aj. Similar write operation is performed on the discharge cells in the third and subsequent lines so that data in (2k−1)th line is written into (2k−1)th and (2k)th lines until all discharge cells are written in response to data. The sustain pulse is applied alternately to the scan electrode Yi and the sustain electrode X to cause some of all discharge cells which receive the wall charge to produce a discharge to illuminate. The above-described processing is performed repeatedly on all subfields until one-field display is completed.

Figure 6B:
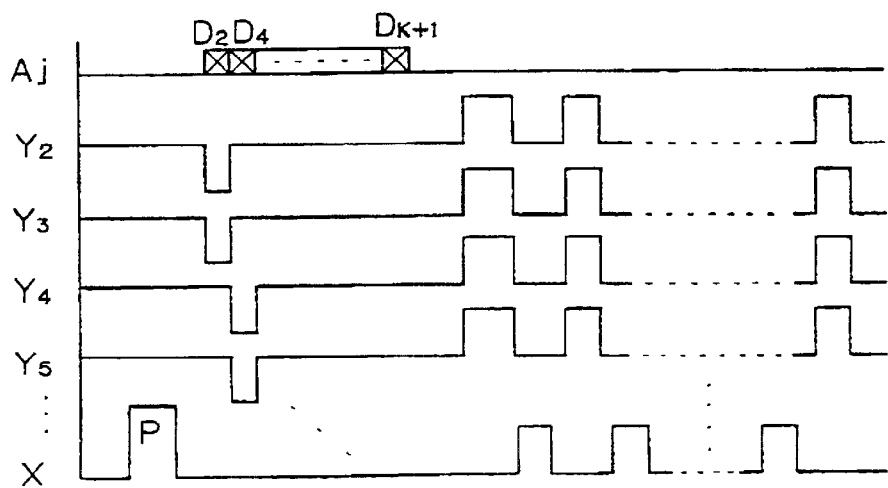

FIG. 6B is a timing chart showing a one-subfield operation when an even-numbered field data is inputted. In an even-numbered field, data is written into two lines, for example, in such a manner that the even-numbered line data D2 and D4 are written into the second and third lines and the fourth and fifth lines, respectively.

The simultaneous two-line writing eliminates the need for an interpolation operation of data and accordingly a logic circuit for executing the interpolation operation. Additionally, two-line writing can be performed by writing data once. This reduces the time required for writing to half the time required for writing in the case of the typical non-interlace signal, thereby providing a time margin. Then, time for the above described increase in the number of gradation levels and measures against the moving picture pseudo contour is obtained. However, the use of such a driving method results in the same display in two lines, which decreases the resolution of the image and causes some flicker.

Examples of the television signal include a PAL signal and a SECAM signal as well as the NTSC signal. These signals differ from each other in the number of fields per second and the number of scanning lines. For example, the PAL signal generally provides 50-field display per second, that is, provides more time margin per field than the NTSC signal. An interpolation operation is required to display the PAL signal on the PDP which has the resolution tailored to the NTSC signal since the PAL signal differs in the number of scanning lines from the NTSC signal. Therefore, in the preferred embodiment of the present invention, the PDP resolution is tailored to the NTSC signal, and the above stated simultaneous two-line writing technique is used to display the NTSC signal whereas the interpolation operation based on the upper and lower scanning lines and the conversion into the non-interlace signal are performed to display the PAL signal.

Changing the driving method in this manner in response to the signal format of the input signal offers following advantages:

In displaying the NTSC signal,
(1) Although there has been no time margin because of the 60-field display per second, the simultaneous two-line writing provides a time margin.
(2) The need for a circuit for executing the interpolation operation is eliminated.

In displaying the PAL signal,
(1) The conversion into the non-interlace signal by interpolation provides a high-resolution image with a small amount of flicker.
(2) The 50-field display per second provides a relatively sufficient time margin without the execution of the simultaneous two-line writing.
(3) The interpolation operation may be shared with a processing circuit for converting the resolution of the PAL signal to that of the NTSC signal.

As above described, the preferred embodiment may suitably drive the PDP in response to the respective signal formats.

If the input signal has other signal formats, for example, a VGA signal but is originally the non-interlace signal, the signal is displayed as the non-interlace signal. The time margin which may be produced by reducing the number of gradation levels or taking no measures against the moving picture pseudo contour such as subfield division presents no problem.

(D) APC Characteristics

Figure 7:
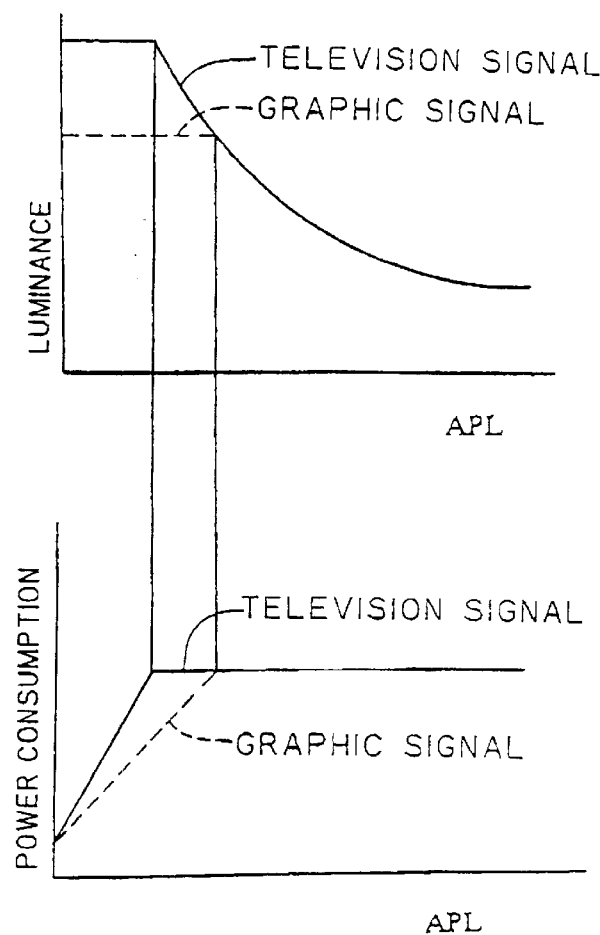
FIG. 7 illustrates APC characteristic control in the plasma display device according to the preferred embodiment of the present invention.

In this preferred embodiment, the APC (automatic power control) characteristics are changed depending on whether the input signal is the television signal or the graphic signal as shown in FIG. 7. The APC of the plasma display is carried out by increasing/decreasing the number of sustain pulses per field according to the APL so that a constant maximum luminance (peak luminance) is reached for a low APL and the luminance decreases as the APL increases, as indicated by the APL versus luminance characteristic of FIG. 7. This suppresses power consumption at a fixed level when the APL is high as indicated by the APL versus power consumption characteristic of FIG. 7.

If the input signal is the graphic signal, the peak luminance is set to a low level when the APL is low as indicated by the broken line of FIG. 7. For the graphic signal often representing an unmoving image, the luminance which is set too high might cause sticking at the associated discharge cell. Thus, the peak luminance for the graphic signal may be suppressed to prevent the occurrence of the sticking. On the other hand, if the input signal is the television signal, a well-contrasted image is achieved by setting the peak luminance to a high level when the APL is low. As indicated by the APL versus power consumption characteristic of FIG. 7, the luminance of the television signal for a high APL is set to a level similar to that provided when the input signal is the graphic signal. This reduces the maximum power consumption of the television signal to a level similar to that of the graphic signal.

(E) The Number of Times of Priming Discharge Per Field

In this preferred embodiment, the frequency with which the priming pulse P causes the write discharge at all cells is changed in response to the input signal. Referring to FIG. 8, if the input signal is the television signal, the priming pulses P are not generated in all subfields, but some of the priming pulses P are replaced with erase pulses E of a narrow width.

More specifically, the priming pulse P is generated in the first subfield. All discharge cells are discharged at the rising edge of the priming pulse, and the wall charge is erased in all discharge cells at the falling edge of the priming pulse. In the next subfield, the narrow-width erase pulse E is inserted in place of the priming pulse P. Such a narrow-width erase pulse E allows an erase discharge to be produced only at the cells in which a sustain operation has been performed in the previous subfield, but does not cause all discharge cells to be discharged unlike the priming pulse.

The use of the narrow-width erase pulse E in place of the priming pulse P may increase an image contrast to aid in enhancing the contrast of the television image.

The priming pulse is to provide the full write discharge at all discharge cells. Thus, the discharge caused by the priming pulse P rather than the narrow-width erase pulse maintains more positively uniform wall charges at the discharge cells to enhance the discharge stability and to reduce discharge failures at the discharge cells. For the television image which contains a large number of moving pictures constantly changing throughout the image, some discharge failures often do not constitute a matter of concern, but a high contrast is rather preferable. On the other hand, for the graphic signal often representing a still picture, the image to be displayed has a clear contour and exhibits a relatively even luminance change. Thus, in the case of still image display which shows conspicuous flicker due to the discharge failures, it is preferable to generate priming pulses P with increased frequency in each subfield, such as the production of the full write discharge by the priming pulses P, in order to ensure wall charge erasing.

As stated above, the number of priming pulses per field is decreased if the input signal is the television signal, and is increased if the input signal is the graphic signal. This provides a high-contrast television image and a flicker-reduced graphic image.

(F) Write Time Per Cell

Figure 9A:
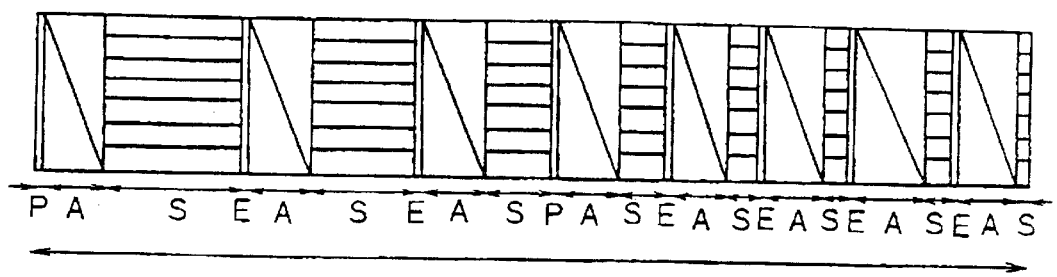
FIGS. 9A and 9B illustrate the timing of generation of the priming pulse P and the elongation of a write time in the plasma display device according to the preferred embodiment of the present invention.
Figure 9B:
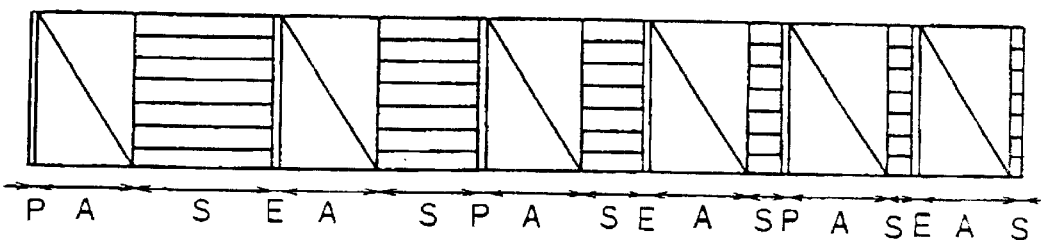

In this preferred embodiment, the time required to write data is changed in response to the signal format of the input signal as shown in FIGS. 9A and 9B. The set value for write time is included in the pieces of control signal information 6(1) to 6(n), whereby the write time for the graphic signal shown in FIG. 9B is made longer than the write time for the television signal shown in FIG. 9A, for example. That is, the write time is made longer when the input signal is the graphic signal. This ensures the supply of the wall charge by writing data at each discharge cell to ameliorate the flicker resulting from the discharge failures on the screen of the graphic image. When the input signal is the television signal, the write time is shortened to provide a time margin which may be used to increase the number of gradation levels and to divide the subfield as measures against the pseudo contour. For instance, for the television signal, eight subfields constitute one field and the priming pulses P are generated in the first and fourth subfields as shown in FIG. 9A. This achieves multi-level gradation and the prevention of the moving picture pseudo contour as well as providing a well-contrasted image. For the graphic signal, six subfields constitute one field to elongate the data write time as shown in FIG. 9B, and the priming pulses P are generated in the first, third an fifth subfields. This ensures the write discharge to suppress the flicker resulting from the discharge failures on the screen.

(G) The Number of Sustain Pulses Per Field

In this preferred embodiment, the number of sustain pulses per field is changed in response to the input signal when a one-field period in driving the PDP is synchronized with the vertical synchronization signal in the input signal. This change is made to solve such a problem that a screen brightness changes depending on the signal format if the number of sustain pulses per field is fixed since the number of fields per second (vertical synchronization frequency) differs depending on the signal format. For example, if consideration is given on the basis of the NTSC signal, the number of sustain pulses per unit time substantially decreases to lower the luminance when the vertical synchronization frequency of the input signal is lower than that of the NTSC signal.

To solve the above described problem, the number of sustain pulses is increased/decreased or in inverse proportion to the vertical synchronization frequency. For instance, the number of sustain pulses for the PAL signal (50 Hz) may be made 1.2 times greater than that for the NTSC signal (60 Hz) to achieve the same level of luminance for the NTSC signal an the PAL signal.

More specifically, the driving sequence of the display panel 8 is changed in response to the signal format of the input signal to drive the display panel 8. The driving sequence is previously stored in the pieces of control signal information 6(1) to 6(n) in the mode-by-mode control signal generating circuit 5 and is accomplished by performing control to select one of the pieces of control signal information 6(1) to 6(n) in response to the signal format of the input signal.

(H) Color Temperature Conversion

In this preferred embodiment, the processing in the video signal processing circuit 3 is changed in response to the signal format of the input signal.

In many cases, colors of high color temperatures are generally preferred for the television image. With the PDP, the luminance efficiency of blue phosphors is relatively lower than that of other colors because of state-of-the-art process technology and restrictions on the physical properties of the phosphors. To raise the color temperature of blue, the luminance of other colors (green and red) among the three primary colors of light must be lowered. Accordingly, when an image of a high color temperature is displayed on the PDP, the luminance of the entire PDP tends to decrease, resulting in poor visibility. Thus, some means must be devised to display characters and the like.

In this preferred embodiment, the characteristics of the color temperature conversion in the video signal processing circuit 3 are changed in response to the type of the input signal. That is, the color temperature conversion is performed based on the input signal format upon image data provided by digitizing a net image signal part after the separation of the synchronization signal part from the input signal. More specifically, a higher color temperature is set for the television signal, and a lower color temperature is set for the graphic signal. This provides a high luminance to enable good visibility of characters and the like when the input signal is the graphic signal. Further, when the input signal is the television signal, the color temperature is raised to display a generally preferred image.

Additionally, the color temperature may be controlled depending on whether the television signal is the NTSC signal, the PAL signal, or th SECAM signal. In particular, since lower color temperatures are preferred in Europe, the color temperatures for the PAL and SECAM signals adopted in Europe may be set slightly lower than those for the NTSC signal.

While the invention has been described in detail, the foregoing description is in all aspects illustrative and not restrictive. It is understood that numerous other modifications and variations can be devised without departing from the scope of the invention.

I claim:

1. A plasma display device drive circuit for driving a plasma display panel from an input video signal comprising:

a signal format identifying circuit for identifying a signal format of said input video signal and generating an identification output representative of an identified signal format;

a control signal output circuit outputting a control signal responsive to said signal format of said input video signal identified by said signal format identifying circuit; said control signal output circuit including, a selecting circuit selecting one of a plurality of previously determined pieces of control information based on said identification output developed by said signal format identifying circuit, said control signal output by said control signal output circuit being based on said selected piece of control information;

drive circuit for driving said plasma display panel based on said control signal outputted from said control signal output circuit; and wherein said signal format identifying circuit identifies said signal format of said input video signal based on attributes which are detected from said input video signal.

2. The plasma display device drive circuit according to claim 1,
 wherein said pieces of control information include a number of subfields previously determined in response to said signal format of said input video signal, and
 wherein one field time period is divided into subfield time periods the number of which equals said number of subfields for representation of gradation.

3. The plasma display device drive circuit according to claim 1,
 wherein said pieces of control information include frequency with which a priming pulse is generated per field, said frequency being previously determined in response to said signal format of said input video signal.

4. The plasma display device drive circuit according to claim 1,
 wherein said pieces of control information include a set value for write time per cell, said set value for write time being previously determined in response to said signal format of said input video signal, and
 wherein a write operation of data into said plasma display panel is controlled based on said set value for write time.

5. The plasma display device drive circuit according to claim 1,
 wherein said pieces of control information include the number of sustain pulses per field, said number of sustain pulses being previously determined in response to said signal format of said input video signal.

6. The plasma display of claim 1 wherein said signal format identifying circuit identifies whether said input video signal is a television or graphic signal based on whether a synchronization signal is detected.

7. The plasma display of claim 1 wherein said signal format identifying circuit identifies the signal format of said input video signal based on the periods of the synchronization signal.

8. A plasma display device drive circuit for driving a plasma display panel from an input video signal comprising:
 a signal format identifying circuit for identifying a signal format of said input video signal and generating an identification output representative of an identified signal format;
 a control signal output circuit outputting a control signal responsive to said signal format of said input video signal identified by said signal format identifying circuit; said control signal output circuit including,
  a selecting circuit selecting one of a plurality of previously determined pieces of control information based on said identification output developed by said signal format identifying circuit, said control signal output by said control signal output circuit being based on said selected piece of control information; and
 drive circuit for driving said plasma display panel based on said control signal outputted from said control signal output circuit; and
 wherein whether or not to divide a one field time period into a plurality of subfield time periods, the number of which is greater than a minimum number of subfields required to represent said gradation in order to prevent a pseudo contour of a moving picture, is controlled in response to said signal format of said input video signal.

9. A plasma display device drive circuit for driving a plasma display panel from an input video signal comprising:
 a signal format identifying circuit for identifying a signal format of said input video signal and generating an identification output representative of an identified signal format;
 a control signal output circuit outputting a control signal responsive to said signal format of said input video signal identified by said signal format identifying circuit; said control signal output circuit including,
  a selecting circuit selecting one of a plurality of previously determined pieces of control information based on said identification output developed by said signal format identifying circuit, said control signal output by said control signal output circuit being based on said selected piece of control information; and
 drive circuit for driving said plasma display panel based on said control signal outputted from said control signal output circuit;
 wherein said pieces of control information include the number of sustain pulses per field for an average picture level ("APL"), said number of sustain pulses being previously determined in response to said signal format of said input video signal, and
 wherein automatic power control ("APC") characteristics are changed based on said number of sustain pulses.

10. A plasma display device drive circuit for driving a plasma display panel from an input video signal comprising:
 a signal format identifying circuit for identifying a signal format of said input video signal and generating an identification output representative of an identified signal format;
 a control signal output circuit outputting a control signal responsive to said signal format of said input video signal identified by said signal format identifying circuit; said control signal output circuit including,
  a selecting circuit selecting one of a plurality of previously determined pieces of control information based on said identification output developed by said signal format identifying circuit, said control signal output by said control signal output circuit being based on said selected piece of control information; and
 drive circuit for driving said plasma display panel based on said control signal outputted from said control signal output circuit;
 wherein said pieces of control information include color temperature conversion characteristics of image data, said color temperature conversion characteristics being previously determined in response to said signal format of said input video signal.

11. A method of driving a plasma display device from an input video signal, comprising the steps of:
 identifying a signal format of said input video signal;
 outputting a control signal in response to said signal format of said input video signal identified in said step of identifying; and
 driving a plasma display panel based on said control signal;
 wherein said control signal is generated based on an identification output responsive to said signal format of said input video signal;
 wherein said control signal is provided based on one piece of control information selected in response to said identification output among a plurality of previously prepared pieces of control information; and wherein said step of identifying identifies said signal format based on attributes which are detected from said input video signal.

12. The method according to claim 11, wherein said pieces of control information include a number of subfields previously determined in response to said signal format of said input video signal, and wherein one field time period is divided into subfield time periods the number of which equals said number of subfields for representation of gradation.

13. The method according to claim 11, wherein said pieces of control information include frequency with which a priming pulse is generated per field, said frequency being previously determined in response to said signal format of said input video signal.

14. The method according to claim 11, wherein said pieces of control information include a set value for write time per cell, said set value for write time being previously determined in response to said signal format of said input video signal, and wherein a write operation of data into said plasma display panel is controlled based on said set value for write time.

15. The method according to claim 11, wherein said pieces of control information include the number of sustain pulses per field, said number of sustain pulses being previously determined in response to said signal format of said input video signal.

16. The method of claim 11 wherein said step of identifying identifies whether said input video signal is a television or graphic signal based on whether a synchronization signal is detected.

17. The method of claim 11 wherein said step of identifying identifies the signal format of said input video signal based on the periods of the synchronization signal.

18. A method of driving a plasma display device from an input video signal, comprising the steps of:

identifying a signal format of said input video signal from the content of the video signal;

outputting a control signal in response to said signal format of said input video signal identified in said step of identifying; and driving a plasma display panel based on said control signal;

wherein said control signal is generated based on an identification output responsive to said signal format of said input video signal;

wherein said control signal is provided based on one piece of control information selected in response to said identification output among a plurality of previously prepared pieces of control information; and wherein whether or not to divide a one field time period into a plurality of subfield time periods, the number of which is greater than a minimum number of subfields required to represent said gradation in order to prevent a pseudo contour of a moving picture, is controlled in response to said signal format of said input video signal.

19. A method of driving a plasma display device from an input video signal, comprising the steps of:

identifying a signal format of said input video signal from the content of the video signal;

outputting a control signal in response to said signal format of said input video signal identified in said step of identifying; and driving a plasma display panel based on said control signal;

wherein said control signal is generated based on an identification output responsive to said signal format of said input video signal;

wherein said control signal is provided based on one piece of control information selected in response to said identification output among a plurality of previously prepared pieces of control information; and wherein said pieces of control information include the number of sustain pulses per field for an average picture level ("APL"), said number of sustain pulses being previously determined in response to said signal format of said input video signal; and wherein automatic power control ("APC") characteristics are changed based on said number of sustain pulses.

20. A method of driving a plasma display device from an input video signal, comprising the steps of:

identifying a signal format of said input video signal from the content of the video signal;

outputting a control signal in response to said signal format of said input video signal identified in said step of identifying; and driving a plasma display panel based on said control signal;

wherein said control signal is generated based on an identification output responsive to said signal format of said input video signal;

wherein said control signal is provided based on one piece of control information selected in response to said identification output among a plurality of previously prepared pieces of control information; and wherein said pieces of control information include color temperature conversion characteristics of image data, said color temperature conversion characteristics being previously determined in response to said signal format of said input video signal.

21. A plasma display device drive circuit for driving a plasma display panel from an input video signal comprising:

a control signal output circuit outputting a control signal responsive to a signal format which is detected from said input video signal;

a driving circuit for driving said plasma display panel based on said control signal outputted from said control signal output circuit, wherein said control signal is provided based on control information wherein said control information includes a number of subfields which is previously determined in response to said signal format of said input video signal; and wherein one field time period is divided into subfield time periods the number of which equals said number of subfields for representation of gradation.

22. A plasma display device drive circuit for driving a plasma display panel from an input video signal comprising:

a control signal output circuit outputting a control signal responsive to a signal format which is detected from said input video signal;

a driving circuit for driving said plasma display panel based on said control signal outputted from said control signal output circuit, wherein said control signal is provided based on control information; and wherein said control information includes a frequency with which a priming pulse is generated per field, said frequency being previously determined in response to said signal format of said input video signal.

23. A plasma display device drive circuit for driving a plasma display panel from an input video signal comprising:

a control signal output circuit outputting a control signal responsive to a signal format which is detected from said input video signal; and a driving circuit for driving said plasma display panel based on said control signal outputted from said control signal output circuit;

wherein said control signal is provided based on control information:

wherein said control information includes a set value for write time per cell, said set value for write time being previously determined in response to said signal format of said input video signal; and wherein a write operation of data into said plasma display panel is controlled based on said set value for write time.

24. A plasma display device drive circuit for driving a plasma display panel from an input video signal comprising:

a control signal output circuit for outputting a control signal responsive to the signal format of said input video signal; and a driving circuit for driving said plasma display panel based on said control signal outputted from said control signal output circuit, wherein said control signal is provided based on control information:

wherein said control information includes a number of sustain pulses per field for an average picture lever ("APL"), said number of sustain pulses being previously determined in response to said signal format of said input video signal, and wherein automatic power control ("APC") characteristics are changed based on said number of sustain pulses.

25. A plasma display device drive circuit for driving a plasma display panel from an input video signal comprising:

a control signal output circuit outputting a control signal responsive to a signal format which is detected from said input video signal;

a driving circuit for driving said plasma display panel based on said control signal outputted from said control signal output circuit, wherein said control signal is provided based on control information; and wherein said control information includes a number of sustain pulses per field, said number of sustain pulses being previously determined in response to said signal format of said input video signal.

26. A plasma display device drive circuit for driving a plasma display panel from an input video signal comprising:

a control signal output circuit for outputting a control signal responsive to the signal format of said input video signal; and a driving circuit for driving said plasma display panel based on said control signal outputted from said control signal output circuit, wherein said control signal is provided based on control information, and wherein said control information includes color temperature conversion characteristics of image data, said color temperature conversion characteristics being previously determined in response to said signal format of said input video signal.

* * * * *